(12) United States Patent
Kalra et al.

(10) Patent No.: US 11,830,029 B2
(45) Date of Patent: Nov. 28, 2023

(54) AUTOMATED OPTIMIZATION AND PERSONALIZATION OF CUSTOMER-SPECIFIC COMMUNICATION CHANNELS USING FEATURE CLASSIFICATION

(71) Applicant: FMR LLC, Boston, MA (US)

(72) Inventors: Aditi Kalra, New Delhi (IN); Shounak Ghosal, Bangalore (IN); Susan Abraham, Needham, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/405,926

(22) Filed: Aug. 18, 2021

(65) Prior Publication Data

US 2023/0057018 A1 Feb. 23, 2023

(51) Int. Cl.
*G06Q 30/02* (2023.01)
*G06Q 30/0242* (2023.01)
*G06Q 30/0251* (2023.01)

(52) U.S. Cl.
CPC ..... *G06Q 30/0244* (2013.01); *G06Q 30/0254* (2013.01); *G06Q 30/0255* (2013.01); *G06Q 30/0269* (2013.01)

(58) Field of Classification Search
CPC .......... G06Q 30/0244; G06Q 30/0254; G06Q 30/0255; G06Q 30/0269

USPC .................... 705/14.43, 14.52, 14.53, 14.66
See application file for complete search history.

(56) References Cited

U.S. PATENT DOCUMENTS

| | | | |
|---|---|---|---|
| 9,210,265 B2 | 12/2015 | Bulbul et al. | |
| 9,258,424 B2 | 2/2016 | Talapady et al. | |
| 9,986,089 B2 | 5/2018 | Gilbert | |
| 2011/0166915 A1 | 7/2011 | Wang et al. | |
| 2013/0060587 A1 | 3/2013 | Bayrak et al. | |

(Continued)

OTHER PUBLICATIONS

Camps, Chris, How to measure and optimize customer engagement on any channel, ClickZ.com, dated May 25, 2017, downloaded Jun. 14, 2022 from https://www.clickz.com/how-to-measure-and-optimize-customer-engagement-on-any-channel/111303/ (Year: 2017).*

(Continued)

*Primary Examiner* — Scott D Gartland
(74) *Attorney, Agent, or Firm* — Cesari & McKenna, LLP

(57) ABSTRACT

Methods and apparatuses are described for automated optimization and personalization of customer-specific communication channels using feature classification. A server captures historical interaction data comprising a channel type, a user identifier, an interaction date, and a user response value. The server generates a channel feature vector for each combination of channel type, user identifier, and interaction date. The server identifies features from the channel feature vectors for each different channel type and aggregates the features into a common feature vector. The server executes a trained classification model on the common feature vectors to select user identifiers for each different channel type that (Continued)

have an engagement probability value at or above a corresponding threshold. The server determines, for each different channel type, a distance value between the engagement probability value and the corresponding threshold and communicates with a remote computing device via a channel that is associated with an optimal distance value.

26 Claims, 7 Drawing Sheets

(56) References Cited

U.S. PATENT DOCUMENTS

| | | | |
|---|---|---|---|
| 2015/0339677 | A1 | 11/2015 | Chan et al. |
| 2016/0036977 | A1 | 2/2016 | Chan et al. |
| 2016/0148248 | A1 | 5/2016 | Sinha et al. |
| 2017/0032280 | A1* | 2/2017 | Socher .................. G06N 3/044 |
| 2017/0061480 | A1 | 3/2017 | Zhou et al. |
| 2018/0084111 | A1* | 3/2018 | Pirat ...................... H04L 51/04 |
| 2019/0238682 | A1* | 8/2019 | Christiano ............ H04M 3/563 |
| 2020/0320381 | A1* | 10/2020 | Venkatraman ....... G06Q 10/067 |
| 2021/0029246 | A1* | 1/2021 | Erhart .................. H04L 51/043 |
| 2021/0248687 | A1* | 8/2021 | Albert .................. H04L 67/306 |

OTHER PUBLICATIONS

Barbaro et al., Modelling and predicting User Engagement in mobile applications, Data Science, IOS Press, vol. 3, 2020, pp. 61-77, DOI 10.3233/DS-190027, downloaded from https://content.iospress.com/download/data-science/ds190027?id=data-science%2Fds190027 on Jul. 10, 2023 (Year: 2020).*

W. Hong et al., "A Color Image Authentication Scheme With Grayscale Invariance," IEEE Access, vol. 9, 6522-6535, Jan. 12, 2021, DOI: 10.1109/ACCESS.2020.3047270, 14 pages.

"Dmlc / xgboost: Scalable, Portable and Distributed Gradient Boosting (GBDT, GBRT or GBM) Library, for Python, R, Java, Scala, C++ and more," https://github.com/dmlc/xgboost, dated Jul. 5, 2021, accessed via the Internet Archive's Wayback Machine on Feb. 22, 2023 at https://web.archive.org/web/20210705014302/https://github.com/dmlc/xgboost, 4 pages.

T. Chen and C. Guestrin, "XGBoost: A Scalable Tree Boosting System," In 22nd SIGKDD Conference on Knowledge Discovery and Data Mining (KDD '16), Aug. 13-17, 2016, San Francisco, California, USA. Available at https://arxiv.org/pdf/1603.02754.pdf, 13 pages.

C. Wijaya, "Breaking down the agglomerative clustering process," Towards Data Science, Dec. 17, 2019, available at https://towardsdatascience.com/breaking-down-the-agglomerative-clustering-process-1c367f74c7c2, 23 pages.

* cited by examiner

AUTOMATED OPTIMIZATION AND PERSONALIZATION OF CUSTOMER-SPECIFIC COMMUNICATION CHANNELS USING FEATURE CLASSIFICATION

TECHNICAL FIELD

This application relates generally to methods and apparatuses, including computer program products, for automated optimization and personalization of customer-specific communication channels using feature classification.

BACKGROUND

Large consumer-facing companies constantly face a challenge of retaining their existing customers and expanding to reach new customers, especially considering the fragmentation and diversity of customer bases. Companies want to efficiently contact existing and potential customers in a manner that will have the best likelihood of receiving a response or other type of engagement from the given customer. For example, prior customer interaction information is important to understand which contact channel(s) (e.g., email, phone, website) most often result in a particular engagement or response from the user. As a result, systems aim to leverage this information in determining a preferred or optimal contact channel for each user across certain contact campaigns. For customer-focused organizations, it is imperative to identify and address the specific personalized contact preferences of each of the customers which, if not done, might lead to attrition of the customer base (and thus a decrease in revenue).

A challenge in solving the above problem arises in the cost incurred by companies in developing and executing contact campaign strategies. For example, the high cost of phone representatives makes it necessary for companies to utilize their existing contact bandwidth in the most efficient way as possible. Typically, a company's focus is to reach out to customers using a contact channel on which the customer has a high likelihood to be positively persuaded to, e.g., purchase a product, schedule a meeting, view an advertisement, etc. and consequently contribute to the incremental revenue of the sales channel—instead of reaching out to customers via contact channels that the customer does not use or does not prefer, thus resulting in a low likelihood of customer interaction or engagement and lowering the chance that the user contributes to the incremental revenue.

Current communication channel determination systems have been developed using artificial intelligence techniques in an attempt to solve the above problems. However, these systems tend to silo the communication channels, such that each channel has its own exclusion criteria, which means that customers get inadvertently excluded from the contact channel. In addition, the separation of communication channels does not guarantee maximizing the customer engagement or response rate because the systems are not aware of the optimal communication channel to use for each customer—resulting in duplicate effort and customer dissatisfaction. Furthermore, customers that are contacted on channels that they do not prefer typically unsubscribe in greater numbers from future promotional campaigns.

SUMMARY

Therefore, what is needed are automated optimization and personalization of customer-specific communication channels using feature classification that integrate features from a variety of different communication channels into a common feature set, that is then analyzed by the system to predict an optimal communication channel for each user based upon historical information. The techniques described herein advantageously leverage feature-based classification modeling using a feature set that is reduced using advanced algorithms and combine it with threshold-based evaluation of customer engagement to result in an optimized customer contact matrix that identifies the contact channel for each user to maximize responsiveness to targeted outreach. The methods and systems described herein beneficially provide for both a multi-channel solution to customer contact campaigns, as well as a single channel optimization technique.

The invention, in one aspect, features a computer system for automated optimization and personalization of customer-specific communication channels using feature classification. The system comprises a server computing device having a memory for storing computer-executable instructions and a processor that executes the computer-executable instructions. The server computing device captures historical interaction data associated with a plurality of users across a plurality of communication channels, the historical user activity data comprising a channel type, a user identifier, an interaction date, and a user response value. The server computing device generates a channel feature vector for each combination of channel type, user identifier, and interaction date, each channel feature vector comprising a multidimensional array. The server computing device identifies one or more features from the channel feature vectors for each different channel type and aggregates the identified features into a common feature vector for each combination of user identifier and interaction date. The server computing device executes a trained classification model for each different channel type on the common feature vectors to select one or more user identifiers for each different channel type that have an engagement probability value at or above a corresponding engagement threshold value. The server computing device determines, for each different channel type, a distance value between the engagement probability value for each selected user identifier and the corresponding engagement threshold value for the channel type. The server computing device transmits, for each selected user identifier, communications to a remote computing device associated with the selected user identifier via a communication channel associated with an optimal distance value.

The invention, in another aspect, features a computerized method of automated optimization and personalization of customer-specific communication channels using feature classification. A server computing device captures historical interaction data associated with a plurality of users across a plurality of communication channels, the historical user activity data comprising a channel type, a user identifier, an interaction date, and a user response value. The server computing device generates a channel feature vector for each combination of channel type, user identifier, and interaction date, each channel feature vector comprising a multidimensional array. The server computing device identifies one or more features from the channel feature vectors for each different channel type and aggregates the identified features into a common feature vector for each combination of user identifier and interaction date. The server computing device executes a trained classification model for each different channel type on the common feature vectors to select one or more user identifiers for each different channel type that have an engagement probability value at or above a corresponding engagement threshold value. The server computing device determines, for each different channel type, a distance value between the engagement probability value for each selected user identifier and the corresponding engagement threshold value for the channel type. The server computing device transmits, for each selected user identifier, communications to a remote computing device associated with the selected user identifier via a communication channel associated with an optimal distance value.

Any of the above aspects can include one or more of the following features. In some embodiments, capturing historical interaction data comprises: identifying one or more contact campaigns for each of the plurality of communication channels; generating one or more keywords for each identified contact campaign based upon metadata associated with the identified contact campaigns; matching the generated keywords for each identified contact campaigns to one or more other contact campaigns; and capturing historical interaction data from each identified contact campaign and each matched contact campaign. In some embodiments, the plurality of communication channels comprise a voice call channel, an email channel, and a website channel. In some embodiments, when the channel type is a voice call channel, the user response value is based upon a maximum call duration associated with the user. In some embodiments, when the channel type is an email channel, the user response value is based upon an interaction event detected in association with an email sent to the user. In some embodiments, when the channel type is a website channel, the user response value is based upon an interaction event detected in association with a website element displayed to the user.

In some embodiments, the computing device reduces a number of features in the channel feature vector using recursive feature elimination or agglomerative feature clustering prior to aggregating the identified features into a common feature vector. In some embodiments, the number of features in the common feature vector is less than the number of features in the channel feature vector.

In some embodiments, the engagement threshold value associated with each different channel type indicates a baseline value at which a given user is considered to be engaged with the channel type. In some embodiments, the engagement probability value indicates a likelihood that a given user is engaged with the corresponding channel type.

In some embodiments, the distance value comprises a difference that the engagement probability value for each selected user identifier is greater than the corresponding engagement threshold value for the channel type. In some embodiments, the communication channel that is associated with an optimal distance value comprises the communication channel associated with a maximum distance value for the user identifier. In some embodiments, transmitting communications to a remote computing device associated with the selected user identifier comprises initiating one or more outbound communications from the server computing device to the remote computing device using the communication channel associated with the optimal distance value.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
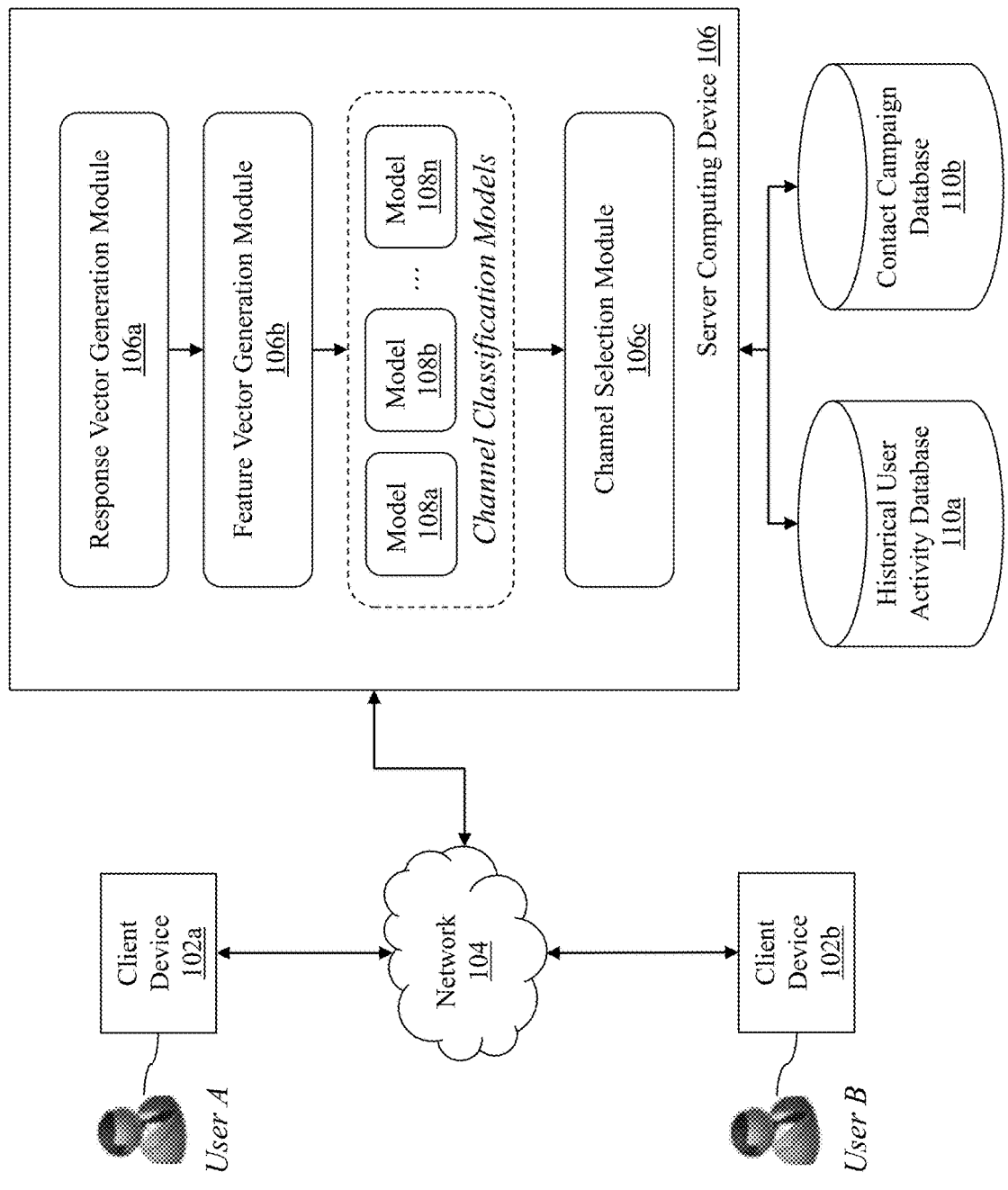
FIG. 1 is a block diagram of a system for automated optimization and personalization of customer-specific communication channels using feature classification.

FIG. 1 is a block diagram of a system 100 for automated optimization and personalization of customer-specific communication channels using feature classification. The system 100 includes client computing devices 102a, 102b, a communications network 104, a server computing device 106 that includes a response vector generation module 106a, a feature vector generation module 106b, a channel selection module 106c, and a plurality of channel classification models 108a-108n, a historical user activity database 110a, and a contact campaign database 110b.

The client computing devices 102a, 102b connect to the communications network 104 in order to communicate with the server computing device 106 to provide input and receive output relating to the process for automated optimization and personalization of customer-specific communication channels using feature classification as described herein. The client computing devices 102a, 102b each can be coupled to a display device (not shown), such as a monitor or screen. For example, client computing devices 102a, 102b can provide a graphical user interface (GUI) via the display device to a user of the corresponding device that presents output resulting from the methods and systems described herein. In some embodiments, the client computing devices 102a, 102b are operated by an end user (e.g., a customer using the device 102a, 102b to receive electronic communications such as emails, text messages, website data, telephone calls, and the like via the server computing device 106 (which can be operated by a business or other entity with which the customer has a relationship).

Exemplary client computing devices 102a, 102b include but are not limited to desktop computers, laptop computers, tablets, mobile devices, smartphones, smart watches, Internet-of-Things (IoT) devices, and internet appliances. It should be appreciated that other types of computing devices that are capable of connecting to the components of the system 100 can be used without departing from the scope of invention. Although FIG. 1 depicts two client computing devices 102*a*, 102*b*, it should be appreciated that the system 100 can include any number of client computing devices.

The communications network 104 enables the client computing devices 102*a*, 102*b*, the server computing device 106, and the databases 110*a*, 110*b* to communicate with each other. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automated optimization and personalization of customer-specific communication channels using feature classification as described herein. The server computing device 106 includes several computing modules 106*a*-106*c* that execute on the processor of the server computing device 106. In some embodiments, the modules 106*a*-106*c* are specialized sets of computer software instructions programmed onto one or more dedicated processors in the server computing device 106 and can include specifically-designated memory locations and/or registers for executing the specialized computer software instructions.

Although the modules 106*a*-106*c* are shown in FIG. 1 as executing within the same server computing device 106, in some embodiments the functionality of the modules 106*a*-106*c* can be distributed among a plurality of server computing devices. As shown in FIG. 1, the server computing device 106 enables the modules 106*a*-106*c* to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106*a*-106*c* is described in detail below.

The server computing device 106 also includes a plurality of classification models 108*a*-108*n* coupled to the modules 106*a*-106*c* of the server computing device 106. Each classification model 108*a*-108*n* comprises a supervised modeling algorithm (e.g., neural network; tree-based algorithms such as: extreme gradient boosting (XGBoost available at github.com/dmlc/xgboost (dated Jul. 5, 2021, as retrieved from the Wayback Machine at archive.org) which cites as a reference T. Chen and C. Guestrin., "XGBoost: A Scalable Tree Boosting System," In 22nd SIGKDD Conference on Knowledge Discovery and Data Mining (KDD '16), Aug. 13-17, 2016, San Francisco, Calif., USA), LightGBM (available from Microsoft Corp.), random forest algorithms; and the like) that is trained on historical customer contact data (e.g., from databases 110*a*, 110*b*) for a specific contact channel (e.g., email, call, onsite) to predict an optimal contact channel for each user using artificial intelligence techniques such as feature classification. In one embodiment, each model 108*a*-108*n* uses the same supervised modeling algorithm in order to ensure better comparison of output. In some embodiments, each model 108*a*-108*n* is trained on historical data for a specific channel type in order to generate a distance score for each customer in that channel, as is explained in greater detail below. The distance scores are then evaluated to determine a predicted optimal contact channel for the user. It should be appreciated that, while FIG. 1 depicts three classification models 108*a*-108*n*, the system 100 can comprise any of a number of classification models without departing from the scope of the technology described herein.

The databases 110*a*-110*b* are located on a single computing device (or in some embodiments, on a set of computing devices) coupled to the server computing device 106 and is configured to receive, generate, and store specific segments of data relating to the process of automated optimization and personalization of customer-specific communication channels using feature classification as described herein. In some embodiments, all or a portion of the databases 110*a*-110*b* can be integrated with the server computing device 106 or be located on a separate computing device or devices. The databases 110*a*-110*b* can be configured to store portions of data used by the other components of the system 100, as will be described in greater detail below.

The historical user activity database 110*a* includes historical user activity data, which in some embodiments is a dedicated section of the database 110*a* that contains specialized data used by the other components of the system 110 to perform at least a portion of the process of automated optimization and personalization of customer-specific communication channels using feature classification as described herein. Generally, the historical user activity data comprises data elements associated with prior interactions and activity of users/customers. For example, the database 110*a* can store information such as user identification information (e.g., user ID, name, account number), user profile information (e.g., user demographics), user account balances, user interaction information (e.g., whether/when/how the user responded to a given contact outreach interaction), and the like. In some embodiments, the user interaction information can comprise detailed information corresponding to a user's interaction with one or more attempts to contact or interact with the user. For example, if a user is sent a marketing outreach email, the user interaction information can comprise data elements associated with a date/time when the email was sent, a date/time when the email was opened and/or a link in the email was clicked, and so forth). Using this information, the system can track whether a user is responsive to a given communication.

In conjunction with the above information, the system also includes a contact campaign database 110*b*. In some embodiments, the contact campaign database 110*b* includes information relating to user contact campaigns (e.g., email campaigns, call campaigns, website ad placements (also called onsite), etc.) designed to target certain users and/or groups of users. For example, the contact campaign database 110*b* can include information such as campaign channel type (e.g., email, call, onsite), campaign ID, campaign metadata (e.g., in the case of an email campaign, the email subject line, email category, etc.), campaign key performance indicators (KPIs) (e.g., customer action or outcome in response to the contact—such as purchase product, set up appointment, etc.). As can be appreciated, the contact campaign information can be correlated to the historical user activity data in order to understand which specific users were contacted for a given campaign, which contact channel was used to contact the user, and whether/how/when the users responded to the contact. This historical information for users and campaigns is important for use in training and executing the channel classification models 108*a*-108*n* as described in detail below.

Figure 2:
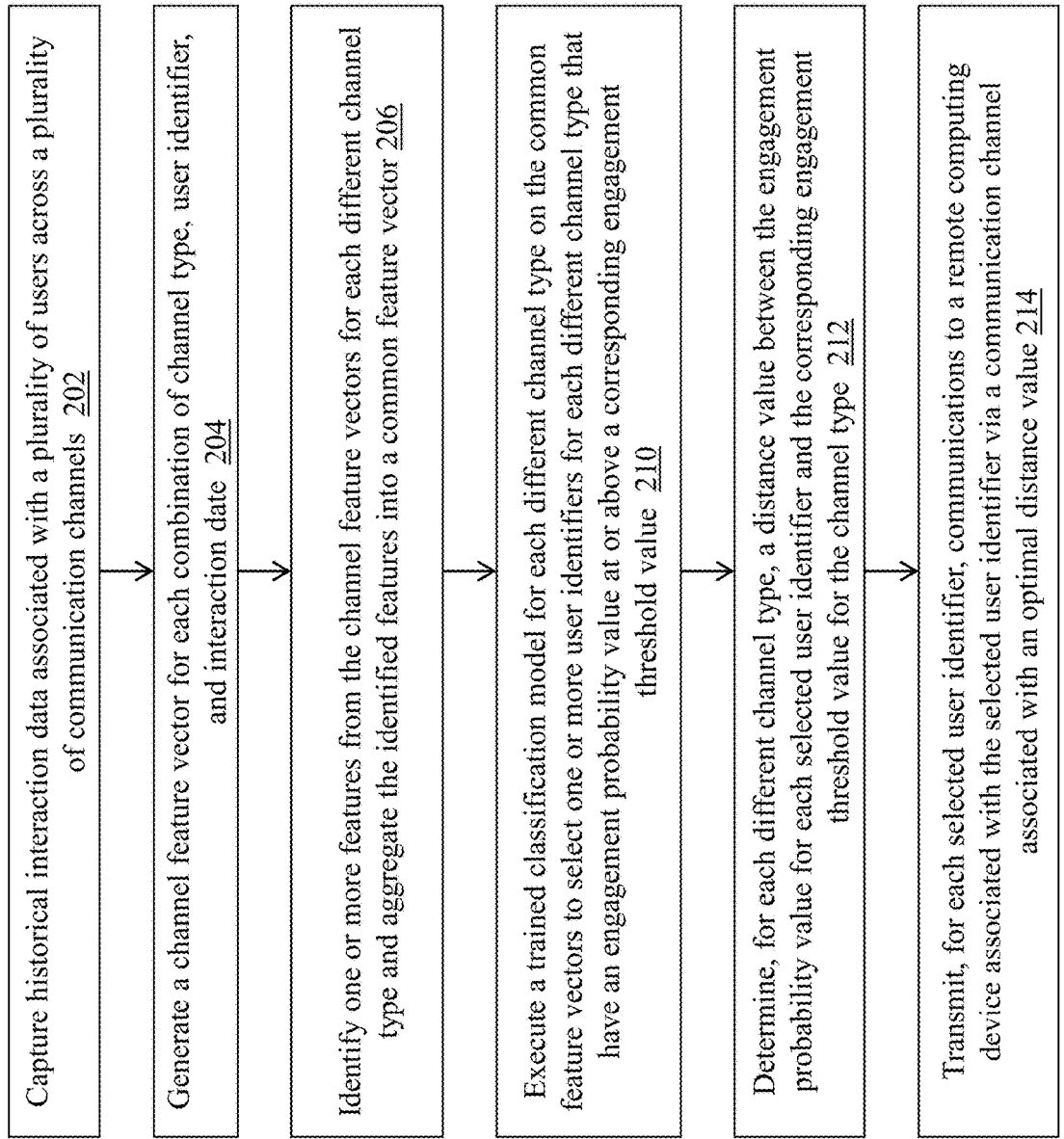
FIG. 2 is a flow diagram of a computerized method of automated optimization and personalization of customer-specific communication channels using feature classification.

FIG. 2 is a flow diagram of a computerized method 200 of automated optimization and personalization of customer-specific communication channels using feature classification, using the system 100 of FIG. 1. The response vector generation module 106a of server computing device 106 captures (step 202) historical user interaction data associated with a plurality of users across a plurality of communication channels. For example, the response vector generation module 106a can retrieve historical user interaction data from the historical user activity database 110a and prepare the data for generation of feature vectors as described below.

Figure 3:
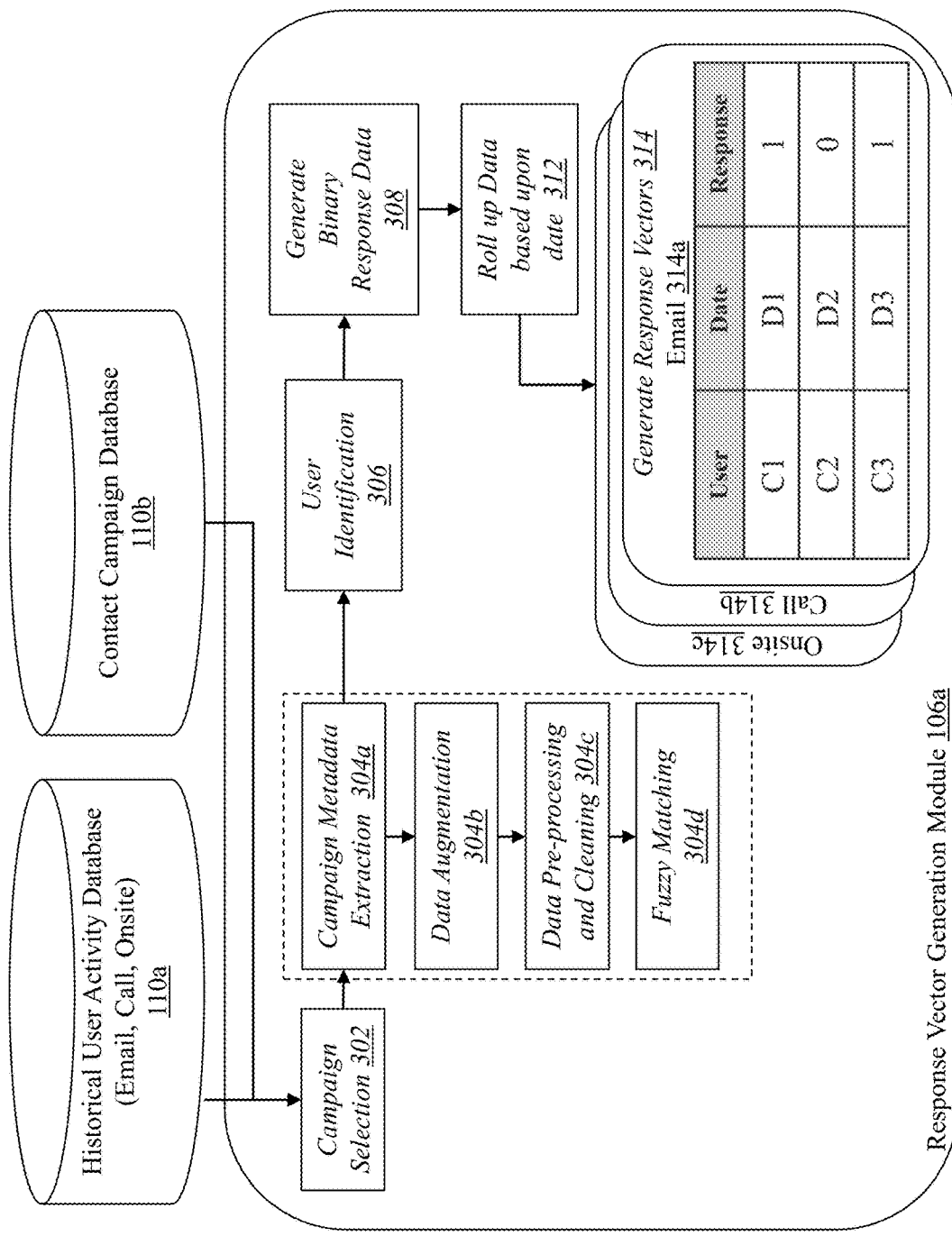
FIG. 3 is a detailed flow diagram of an illustrative embodiment of the processing performed by the response vector generation module of the server computing device.

FIG. 3 is a detailed flow diagram 300 of an illustrative embodiment of the processing performed by the response vector generation module 106a of server computing device 106. As shown in FIG. 3, the module 106a captures the historical user activity data from database 110a for a plurality of users across a plurality of channels (e.g., email, call, onsite) and in some embodiments, the module 106a captures contact campaign data from database 110b. The module 106a performs campaign selection (step 302) using the contact campaign data to identify one or more historical contact campaigns in which users were contacted and have certain KPIs associated with the campaign.

In some embodiments, the response vector generation module 106a can retrieve data for similar or related campaigns in the case where the system 100 wants to optimize the feature classification for specific types of campaigns. This process is shown in FIG. 3 as steps 304a-304d; it should be appreciated that these steps 304a-304d are optional in some embodiments. In step 304a, the module 106a extracts certain campaign metadata from contact campaign database 110b. Typically, the campaign metadata comprises text data that describes one or more aspects of a particular campaign. For example, in the case of an email campaign, the campaign metadata can include elements such as subject line of the contact email, category of the contact email, etc. In the case of a call campaign, the campaign metadata can include elements such as campaign title, category, etc. In the case of an onsite campaign, the campaign metadata can include elements such as category of digital banner ad, etc.

Once the campaign metadata is extracted, the module 106a can perform data augmentation at step 304b, which involves actions like concatenating words from the campaign metadata into a single string or file. Then, the module 106a can perform data pre-processing and cleaning at step 304c, which includes actions such as removing extra spaces, special characters, and numbers, lemmatizing the words in the string, etc.

After the campaign metadata is cleaned, the response vector generation module 106a can perform fuzzy matching at step 304d using the cleaned campaign metadata to identify one or more other contact campaigns that are similar to the given campaign. For example, the module 106a can compare cleaned campaign metadata from a given campaign to cleaned campaign metadata from one or more other campaigns (e.g., of the same channel type) to determine whether the metadata matches or is similar. In one embodiment, the module 106a can use a string/text comparator function to identify whether the metadata is the same, closely similar, or different. For campaigns that have similar metadata, the response vector generation module 106a can retrieve the historical user activity data for those campaigns from database 110a as well.

Once the historical user activity data for the identified campaigns is captured, at step 306 the response vector generation module 106a identifies the users who were contacted as part of the campaigns (e.g. using information contained in the historical user activity data). For example, the module 106a can generate a list of unique user identifiers (such as ID numbers, account numbers, and the like) for the users contacted as part of the identified campaigns. With the list of unique user identifiers, the module 106a can generate binary response data at step 308 for each user identifier. The binary response data can include an indication of whether or not the user associated with the user identifier responded to the contact outreach for the campaign based upon the information in the historical user activity data. For example, the module 106a can be configured to evaluate one or more metrics to determine whether the user responded. Some of these metrics can be based on time—in one example, the module 106a may consider that a user responded to an email contact campaign if a click of a link in the email was detected within a predetermined time period (e.g., seven days) of when the email was sent to the user and the module 106a may consider the at the user did not respond if the email was clicked after the predetermined time period expires. Some of these metrics can be based on recording an interaction of the user with the contact event—e.g., if a user loads a webpage that contains an onsite banner ad that is part of the campaign and/or clicks on the banner ad, then the system can record that activity as a response.

Figure 7:
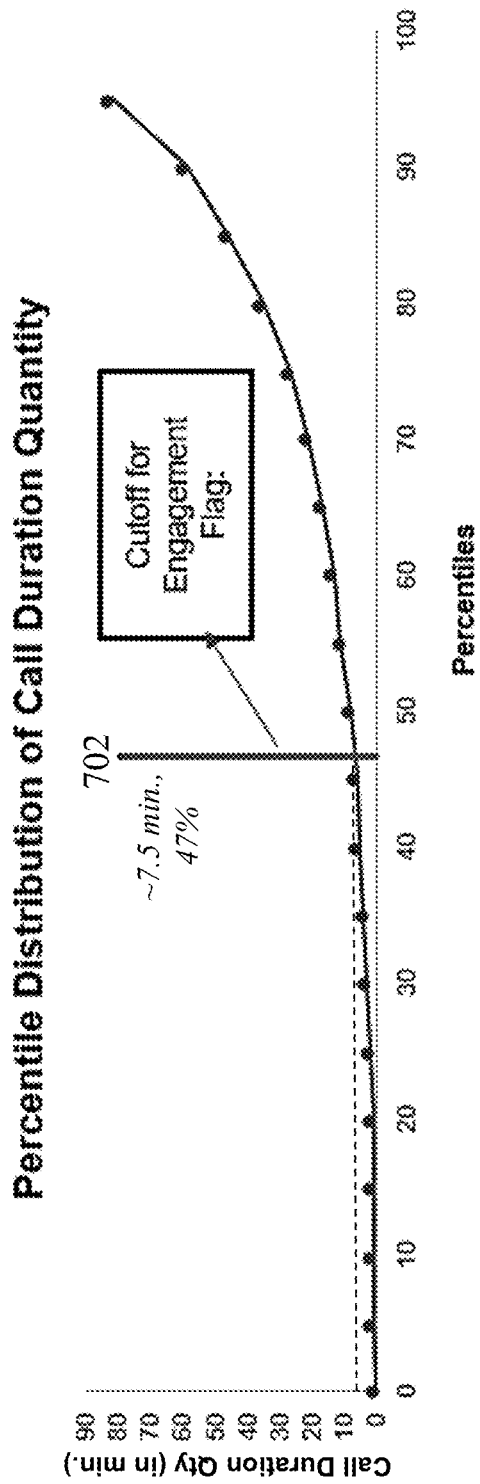
FIG. 7 provides an example of a graph of call channel response data using call duration quantity to determine a threshold engagement value.

Or, if a customer service agent places an outbound call to a user, the user answers the call and spends a certain amount of time on the call (or on a series of related calls), then the activity is considered a response (versus if the user does not answer or does not spend a certain amount of time on the call, which can be considered a non-response). In one example for call outreach, the module 106a can calculate a maximum call duration quantity (in minutes) for each user over a certain time period (e.g., 120 days) from when the campaign was initiated. The module 106a can then create a distribution of the call durations across the users and identify the point of inflection as a cutoff for a user to be engaged (or responsive) to the campaign. FIG. 7 provides an example of a graph 700 of call channel response data using call duration quantity to determine a threshold engagement value. As shown in FIG. 7, the inflection point (line 702) for the call duration data is around 47% or 7.5 minutes. Users that are associated with a call duration above this threshold are considered as engaged or responsive, while users that are below this threshold are considered as non-engaged or non-responsive. It should be appreciated that some of these metrics can be based on a correlation with other events—e.g., if a user receives an email as part of a contact campaign and orders a product identified in the email (even if the user does not expressly click on the email), the system can record this activity as a response. It should be appreciated that various types of metrics can be designed in order to capture specific user responses to given contact events.

Turning back to FIG. 3, once the response vector generation module 106a has generated the binary response data, at step 312 the module 106a rolls up the binary response data based upon the date of contact. In the case of an email campaign, the date of contact can be the date that an email was sent to the user. In the case of a call campaign, the date of contact can be the date that the campaign was initiated. In the case of an onsite campaign, the date of contact can be the date that the user logged into the website and was served the banner ad.

After rolling up the binary response data, at step 314 the response vector generation module 106a generates response vectors for each contact channel type (i.e., email 314a, call 314b, onsite 314c). The response vectors each comprise a matrix with vectors (rows) containing a unique user identifier, a date of contact, and a binary response value (e.g., 0 or 1). As can be appreciated, the module 106a generates a response vector matrix for each contact channel type separately, using the historical user activity data for that channel. After generating the response vectors for each contact channel, the response vector generation module 106a transmits the response vectors to the feature vector generation module 106b for creation of the feature vector data as described below.

Figure 4:
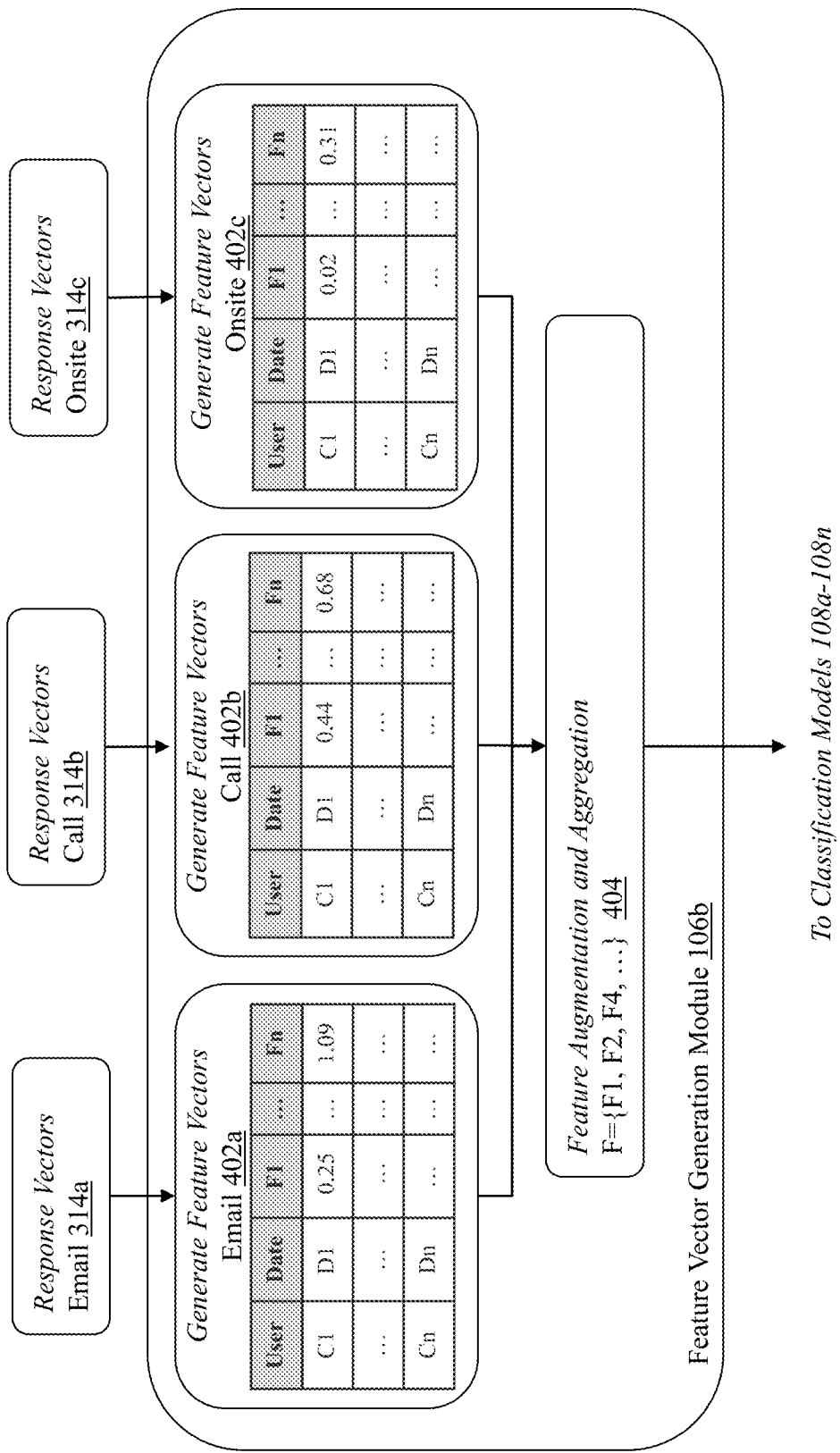
FIG. 4 is a detailed flow diagram of an illustrative embodiment of the processing performed by the feature vector generation module of the server computing device.

Turning back to FIG. 2, the feature vector generation module 106b generates (step 204) a channel feature vector for each combination of contact channel type, user identifier, and interaction/activity date. FIG. 4 is a detailed flow diagram 400 of an illustrative embodiment of the processing performed by the feature vector generation module 106b of server computing device 106. As shown in FIG. 4, the feature vector generation module 106b receives the response vectors for each of the contact channel types (e.g., email 314a, call 314b, onsite 314c) and generates feature vectors for each contact channel type (e.g., email 402a, call 402, onsite 402c). The feature vectors for each contact channel type comprise the user identifier, the interaction date, and a plurality of corresponding features (e.g., F1, F2, . . . ). Generally, the features are numeric values corresponding to an attribute of the interaction for the specific channel type, user, and date combination. Exemplary features include, but are not limited to, individual features (e.g., account open, balance, asset distribution, demographics, interaction history, position, transfer of assets, market variables, etc.), email features (e.g., past email interactions, past open rate on emails, past click rate on emails, etc.), outbound call features (e.g., days since last search for certain topics etc.), onsite features (e.g., past ad search/ad banner search, past clicks on links related to seminars/insights/product research, web visits, etc.). The features are included in a multidimensional vector for each specific channel type, user, and date combination.

Turning back to FIG. 2, once the feature vectors for each contact channel type are generated, the feature vector generation module 106b identifies (step 206) one or more features from the channel feature vectors for each different channel type and aggregates the identified features into a common feature vector for each user identifier and interaction date combination. As shown in FIG. 4, the feature vector generation module 106b processes the features for each different channel type and performs exploratory data analysis and feature reduction to get the final feature list. In some embodiments, the module 106b can perform exploratory data analysis by, e.g.: removing features with greater than a predetermined percentage (e.g., 70%) of missing values; removing features with zero variance; removing features where the $99^{th}$ percentile of values equal the minimum value and/or where the $1^{st}$ percentile of values equal the maximum value; and/or replacing missing values with a median value.

In some embodiments, the module 106b can perform supervised and/or unsupervised feature reduction techniques to generate the features for inclusion in the common feature vector. An exemplary supervised technique for feature reduction is feature ranking with recursive feature elimination through cross validation—as described in P. Misra and A. Singh, "Improving the Classification Accuracy using Recursive Feature Elimination with Cross-Validation," International Journal on Emerging Technologies 11(3): 659-665 (2020), which is incorporated herein by reference. As can be understood, given an external estimator that assigns weights to features (e.g., the coefficients of a linear model), the goal of recursive feature elimination (RFE) is to select features by recursively considering smaller and smaller sets of features. First, the estimator is trained on the initial set of features and the importance of each feature is obtained either through any specific attribute or callable. Then, the least important features are pruned from current set of features. That procedure is recursively repeated on the pruned set until the desired number of features to select is eventually reached.

An exemplary unsupervised technique for feature reduction is agglomerative feature clustering, as described in C. Wijaya, "Breaking down the agglomerative clustering process," Towards Data Science, Dec. 17, 2019, which is incorporated herein by reference. In agglomerative feature clustering, the module 106b performs a hierarchical clustering using a bottom-up approach: each observation starts in its own cluster, and clusters are successively merged. The linkage criteria determine the metric used for the merge strategy:

Ward minimizes the sum of squared differences within all clusters. It is a variance-minimizing approach and in this sense is similar to the k-means objective function but tackled with an agglomerative hierarchical approach.

Maximum or complete linkage minimizes the maximum distance between observations of pairs of clusters.

Average linkage minimizes the average of the distances between all observations of pairs of clusters.

Single linkage minimizes the distance between the closest observations of pairs of clusters.

After the exploratory data analysis and feature reduction described above, the feature vector generation module 106b generates a list of features to be included in the common feature vector, along with a cluster identifier and a ranking value that indicates an importance of the feature. Generally, the module 106b seeks to identify one or more features in each cluster that have a high ranking value, for inclusion in the common feature vector. Once the features for the common feature vector are determined, the feature vector generation module 106b creates the feature vectors for each combination of user identifier and interaction date, extracting the features from each channel vector that are part of the common feature set. F The module 106b transmits the common feature vectors to the classification models 108a-108n for training and/or execution of the models as described below.

Figure 5:
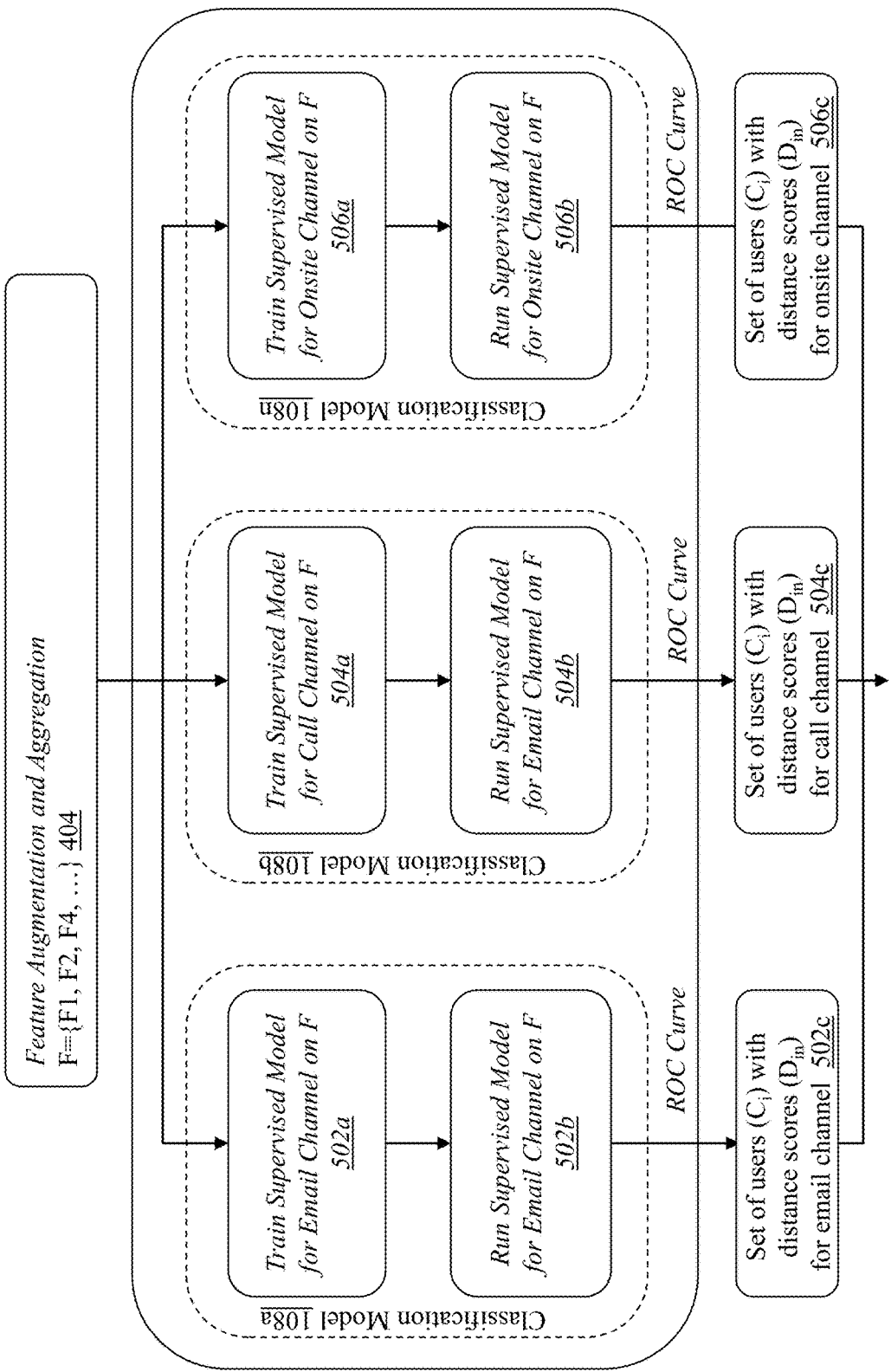
FIG. 5 is a detailed flow diagram of an illustrative embodiment of the processing performed by the classification models of the server computing device.

Turning back to FIG. 2, the classification models 108a-108n receive the common feature vectors from the feature vector generation module 106b for training and execution. FIG. 5 is a detailed flow diagram 500 of an illustrative embodiment of the processing performed by the classification models 108a-108n of server computing device 106. As shown in FIG. 5, each classification model 108a, 108b, 108n corresponds to a different contact channel type—email 108a, call 108b, onsite 108n. The models 108a, 108b, 108n receive the common feature vectors for each user identifier/interaction date combination and train a supervised model for the particular channel type on the vectors with the common feature set F. For example, classification model 108a corresponds to the email contact channel type, and the model 108a trains a supervised model on F (step 502a) then executes the trained model (step 502b) to generate a receiving operator characteristic (ROC) curve based on execution of the trained model. The ROC curve is generally a graph that shows the performance of the classification model at all classification thresholds, plotting the true positive rate (TPR) (i.e., vectors classified as 'responsive' by the model and do in fact correspond to a contact event that generated a response) against the false positive rate (FPR) (i.e., vectors classified as 'responsive' by the model but do not in fact correspond to a contact event that generated a response). It should be appreciated that the system performs the steps above for each different classification model based upon a different contact channel type—i.e., steps 504a and 504b for call classification model 108b and steps 506a and 506b for onsite classification model 108n—in order to generate a different ROC curve for each classification model 108a-108n. It should be appreciated that, in some embodiments, the system utilizes pre-trained classification models so the training step is not required on each execution. Instead, the pre-trained models can be executed by the server computing device to generate engagement probability values for one or more users on one or more channel types.

Once the classification models are trained, the server computing device 106 executes (step 210) the trained classification models 108a-108n for each different channel type on the common feature vectors to select one or more user identifiers for each different channel type that have an engagement probability value at or above a common engagement threshold value. In some embodiments, the server computing device 106 executes each classification model 108a-108n on the common feature vectors for each user/date combination and generates an engagement probability value for each user/date on that channel type. Using the engagement probability values, the server computing device 106 determines the ROC curve for the model and analyzes the ROC curve as described below.

The server computing device 106 analyzes the ROC curve for each classification model 108a-108n to identify a set of users (Ci) and corresponding distance scores (Din) for the associated channel type (steps 502c, 504c, 506c for email, call and onsite channels, respectively). In some embodiments, the server computing device 106 determines an inflection point on the ROC curve for a classification model which indicates a threshold value above which users are considered responsive and below which users are considered non-responsive. The server computing device 106 can then compare individual user engagement probability scores generated by the associated model to the threshold value for the ROC curve to select (step 210) one or more user identifiers from each channel type where the user identifier is associated with an engagement probability value at or above the corresponding engagement threshold value from the ROC curve. For example, the server computing device 106 can execute a function that compares the numeric value of the user's engagement probability value to the numeric value of the threshold and select user identifiers of users that have a numeric probability score that is greater than the numeric value of the threshold.

Once the user identifiers are selected, the server computing device 106 determines (step 212), for each different channel type, a distance value or distance score D between the engagement probability value for each user identifier and the corresponding engagement threshold value for the channel type. In some embodiments, a distance score that exceeds the threshold value indicates a likelihood or probability that a user will respond or engage on the corresponding contact channel, while a distance that is below the threshold value indicates a likelihood or probability that the user will not respond or not engage on the corresponding contact channel. The server computing device 106 determines the distance score for each selected user identifier on each channel type and transmits these user identifiers and distance scores to the channel selection module 106c. This data can be transmitted to the channel selection module 106c as a data set of paired values, e.g., $C_E = \{\{C_1, D_{11}\}, \{C_2, D_{21}\}, \{C_n, D_{in}\}\}$, where E=email channel, n=channel type, and i=ith user.

Figure 6:
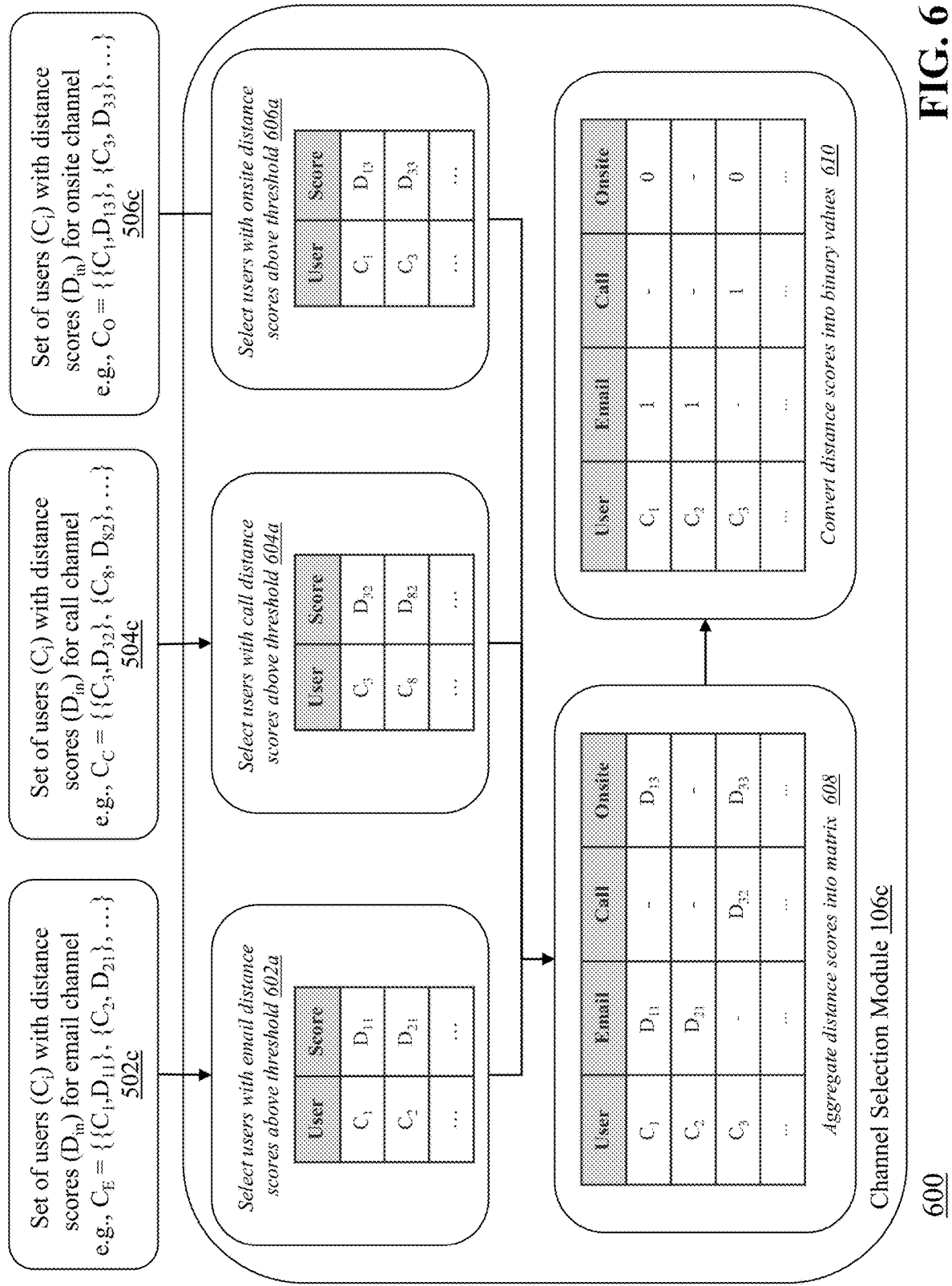
FIG. 6 is a detailed flow diagram of an illustrative embodiment of an illustrative embodiment of the processing performed by the channel selection module of the server computing device.

FIG. 6 is a detailed flow diagram 600 of an illustrative embodiment of the processing performed by the channel selection module 106c of server computing device 106. As shown in FIG. 6, the user identifiers/distance scores from each channel classification model (502c, 504c, 506c) are received at the channel selection module 108c. For each set of scores, the module 106c selects (step 602a for email channel scores, step 604a for call channel scores, step 606a for onsite channel scores) user identifiers that have distances scores D at or above the threshold value from the ROC curve.

The channel selection module 106c then aggregates (step 608) the user distance scores from each channel type into a single matrix. As shown in FIG. 6, the matrix has a row for each user identifier (e.g., $C_1$, $C_2$, $C_3$, . . . ) with a corresponding distance score (e.g., $D_{11}$, $D_{13}$, etc.) in one or more contact channel types. For contact channels where the user does not have a distance score, the value can be left empty.

Once the matrix is created, the channel selection module 106c converts (step 610) the distance scores into binary values—such that a user has a first binary value (e.g., 1) in a single channel type and a second binary value (e.g., 0) in the other channel types—thereby indicating an optimal channel type that can be used to contact the user. As an example, for a particular user, the distance score for the email channel type may be larger than the distance score for the onsite channel type (e.g., $D_{11} > D_{13}$ for user $C_1$ in FIG. 6)—meaning the user has a higher probability of engaging on the email channel than the onsite channel. Therefore, the channel selection module 106c can assign the binary value of 1 to the email channel for that user and assign the binary value of 0 to the other channels.

Turning back to FIG. 2, once the channel selection module 106c has created the binary value matrix in step 610, the channel selection module 106c can use the binary value matrix to transmit (step 214), for each selected user identifier, communications to a remote computing device (e.g., client devices 102a, 102b) associated with the selected user identifier via a communication channel associated with an optimal distance value (i.e., the contact channel that has the binary value of 1).

As an example use case, the channel selection module 106c can utilize the binary value matrix to identify specific users and contact channels to access for the purposes of communicating with the users and achieving engagement from the users. For a newly-launched contact campaign, the channel selection module 106c can retrieve a list of users (e.g., user identifiers) to be targeted as part of the new campaign from the contact campaign database 110b. The channel selection module 106c (and/or another module of the server computing device 106) can retrieve contact information associated with each of the selected user identifiers from, e.g., a customer profile database or other type of customer relationship management repository. For example, the channel selection module 106c can retrieve an email address, a mobile phone number, and/or another type of information (e.g., mobile device ID, IP address, etc.) used to contact the users. In the case of an onsite contact channel, the information may relate to the user's account or login information, such that when the user logs into or otherwise accesses website or app content, the channel selection module 106c can use that information to serve, e.g., a banner ad from the contact campaign to the user's device 102a, 102b.

Once the channel selection module 106c has the user contact information, the channel selection module 106c can determine an optimal contact channel to use for each user as part of the campaign by analyzing the binary value matrix. For example, a given user $C_1$ may have a value of 1 in the email contact column of the matrix—meaning the best probability for engaging the user (and/or receiving a response) in the campaign for that user is to contact them via email. Therefore, the channel selection module 106c can generate a contact email to the user's email address and transmit the email to the client computing device 102a, 102b associated with the particular user. It should be appreciated that similar techniques can be used in the context of a call channel (e.g., mobile phone number as contact information to place a call to the user) or onsite channel (e.g., serving a banner ad to the user).

Another important facet of the techniques described herein is the ability for the system 100 to determine a predicted optimal contact channel for one or more users who do not have a prior user interaction history with the system—also called the 'cold start' problem. In this scenario, the system is capable of comparing a new user to groups of similar users already in the system to determine a nearest user or group of users and associate the new user's optimal contact channel with the new user. The system 100 can utilize a variety of different clustering algorithms to solve the cold start problem, including but not limited to K-means clustering, mean-shift clustering, or density based spatial clustering of applications with noise (DBSCAN).

In some embodiments, DBSCAN works well to identify outliers as noises and can find arbitrarily shaped clusters quite well. The DBSCAN algorithm views clusters as areas of high density separated by areas of low density. The algorithm begins with an arbitrary starting data point that has not been visited. The neighborhood of this point is extracted using a distance epsilon E. If there are a sufficient number of points within this neighborhood, then the clustering process starts and the current data point becomes the first point in the new cluster. Otherwise, the point is labeled as noise. For this first point in the new cluster, the points within its ε distance neighborhood also become part of the same cluster. This procedure of making all points in the ε neighborhood belong to the same cluster is then repeated for all of the new points that have been just added to the cluster group. Once the system 100 is done with the current cluster, a new unvisited point is retrieved and processed, leading to the discovery of a further cluster or noise.

An example of the cold start processing is as follows:

The channel selection module 106c can compare known attributes of the new user as determined from, e.g., profile information, account information, demographics, and the like to similar attributes of existing users. One example of such a comparison can be accomplished via a K-means clustering algorithm, where the user attributes are vectorized and partitioned into clusters based upon a distance measure—e.g., vectors with small distance measures between them are considered to be in the same cluster and a centroid vector is determined from each cluster. Then, the new user's attributes are vectorized and compared to each centroid vector in each cluster to determine which cluster has users with the most similar attributes (i.e., where the distance measure between the new user vector and the centroid vector is the smallest). A similar technique can be used for the DBSCAN algorithm, where the new user's attributes are vectorized and compared to each 'core point' vector in each cluster to determine which cluster has users with the most similar attributes (i.e., where the average distance measure between the new user vector and the core vector points is the smallest).

Once the new user is assigned to a cluster, the channel selection module 106c can generate engagement probability scores for the user in each potential contact channel based upon, e.g., an average score of the users in the cluster for each channel. Then, the channel selection module 106c can compare the engagement probability scores for the new user in each channel and select the highest score as the channel with which the channel selection module 106c should contact the new user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated optimization and personalization of customer-specific communication channels using feature classification, the system comprising a server computing device having a memory for storing computer-executable instructions and a processor that executes the computer-executable instructions to:

capture historical interaction data associated with a plurality of users across a plurality of communication channels, the historical interaction data comprising a channel type, a user identifier, an interaction date, and a user response value;

generate a channel feature vector for each combination of channel type, user identifier, and interaction date, each channel feature vector comprising a multidimensional array of numeric values corresponding to a plurality of attributes of the interaction which include user-related attributes, email attributes, outbound call attributes, and onsite attributes;

identify one or more features from the channel feature vectors for each different channel type, including reducing the number of features using agglomerative feature clustering, generate a list of features each having a cluster identifier and a ranking value, and selecting at least one feature from each cluster with a high ranking value as the identified features;

aggregate the identified features into a common feature vector for each combination of user identifier and interaction date;

train a plurality of machine learning classification models using the common feature vectors, each machine learning classification model built using a supervised modeling algorithm and trained to predict engagement probability values for a different channel type of the plurality of communication channels;

execute the plurality of machine learning classification models on the common feature vectors to select one or more user identifiers for each different channel type that have an engagement probability value at or above a corresponding engagement threshold value, the engagement threshold value determined using a receiving operator characteristic (ROC) curve specific to each of the different trained classification models;
determine, for each different channel type, a distance value between the engagement probability value for each selected user identifier and the corresponding engagement threshold value for the channel type;
aggregate the distance values for all channel types into a user contact matrix, where each row of the matrix comprises a selected user identifier and the corresponding distance values for each channel type;
convert the distance values in the user contact matrix into binary values by determining, for each selected user identifier, a maximum of the distance values, setting the maximum of the distance values to a first binary value, and setting the remaining distance values to a second binary value; and
transmit, for each selected user identifier in the user contact matrix, communications to a remote computing device associated with the selected user identifier via a communication channel that is identified using the first binary value for the selected user identifier in the user contact matrix.

2. The system of claim 1, wherein capturing historical interaction data comprises:
identifying one or more contact campaigns for each of the plurality of communication channels;
generating one or more keywords for each identified contact campaign based upon metadata associated with the identified contact campaigns;
matching the generated keywords for each identified contact campaigns to one or more other contact campaigns; and
capturing historical interaction data from each identified contact campaign and each matched contact campaign.

3. The system of claim 1, wherein the plurality of communication channels comprise a voice call channel, an email channel, and a website channel.

4. The system of claim 3, wherein when the channel type is a voice call channel, the user response value is based upon a maximum call duration associated with the user.

5. The system of claim 3, wherein when the channel type is an email channel, the user response value is based upon an interaction event detected in association with an email sent to the user.

6. The system of claim 3, wherein when the channel type is a website channel, the user response value is based upon an interaction event detected in association with a website element displayed to the user.

7. The system of claim 1, wherein the computing device reduces a number of features in the channel feature vector using recursive feature elimination or agglomerative feature clustering prior to aggregating the identified features into a common feature vector.

8. The system of claim 7, wherein the number of features in the common feature vector is less than the number of features in the channel feature vector.

9. The system of claim 1, wherein the engagement threshold value associated with each different channel type indicates a baseline value at which a given user is considered to be engaged with the channel type.

10. The system of claim 9, wherein the engagement probability value indicates a likelihood that a given user is engaged with the corresponding channel type.

11. The system of claim 1, wherein the distance value comprises a difference that the engagement probability value for each selected user identifier is greater than the corresponding engagement threshold value for the channel type.

12. The system of claim 1, wherein transmitting communications to a remote computing device associated with the selected user identifier comprises initiating one or more outbound communications from the server computing device to the remote computing device using the communication channel that is identified using the first binary value for the selected user identifier in the user contact matrix.

13. The system of claim 1, wherein the server computing device:
determines one or more user attributes of a new user without any historical user activity data and generate a multidimensional vector based upon the one or more user attributes;
compares the multidimensional vector for the new user attributes to a centroid vector of each of one or more clusters associated with historical user data and assign the multidimensional vector for the new user attributes to the cluster with the centroid vector that is most similar to the multidimensional vector;
generates an engagement probability score for the new user in each of a plurality of communication channels by determining an average engagement probability score of all users in the assigned cluster for each of the plurality of communication channels;
selects a communication channel associated with a highest engagement probability score for the new user; and
communicates with a remote computing device associated with the new user via the selected communication channel.

14. A computerized method of automated optimization and personalization of customer-specific communication channels using feature classification, the method comprising:
capturing, by a server computing device, historical interaction data associated with a plurality of users across a plurality of communication channels, the historical user activity data comprising a channel type, a user identifier, an interaction date, and a user response value;
generating, by the server computing device, a channel feature vector for each combination of channel type, user identifier, and interaction date, each channel feature vector comprising a multidimensional array of numeric values corresponding to a plurality of attributes of the interaction which include user-related attributes, email attributes, outbound call attributes, and onsite attributes;
identifying, by the server computing device, one or more features from the channel feature vectors for each different channel type, including reducing the number of features using agglomerative feature clustering, generate a list of features each having a cluster identifier and a ranking value, and selecting at least one feature from each cluster with a high ranking value as the identified features;
aggregating, by the server computing device, the identified features into a common feature vector for each combination of user identifier and interaction date;
training, by the server computing device, a plurality of machine learning classification models using the common feature vectors, each machine learning classification model built using a different supervised modeling algorithm and trained to predict engagement probability values for a different channel type of the plurality of communication channels;

executing, by the server computing device, the plurality of machine learning classification models on the common feature vectors to select one or more user identifiers for each different channel type that have an engagement probability value at or above a corresponding engagement threshold value, the engagement threshold value determined using a receiving operator characteristic (ROC) curve specific to each of the different trained classification models;

determining, by the server computing device for each different channel type, a distance value between the engagement probability value for each selected user identifier and the corresponding engagement threshold value for the channel type;

aggregate the distance values for all channel types into a user contact matrix, where each row of the matrix comprises a selected user identifier and the corresponding distance values for each channel type;

convert the distance values in the user contact matrix into binary values by determining, for each selected user identifier, a maximum of the distance values, setting the maximum of the distance values to a first binary value, and setting the remaining distance values to a second binary value; and transmitting, by the server computing device for each selected user identifier in the user contact matrix, communications to a remote computing device associated with the selected user identifier via a communication channel that is identified using the first binary value for the selected user identifier in the user contact matrix.

15. The method of claim 14, wherein capturing historical interaction data comprises:

identifying one or more contact campaigns for each of the plurality of communication channels;

generating one or more keywords for each identified contact campaign based upon metadata associated with the identified contact campaigns;

matching the generated keywords for each identified contact campaigns to one or more other contact campaigns; and capturing historical interaction data from each identified contact campaign and each matched contact campaign.

16. The method of claim 14, wherein the plurality of communication channels include a voice call channel, an email channel, and a website channel.

17. The method of claim 16, wherein when the channel type is a voice call channel, the user response value is based upon a maximum call duration associated with the user.

18. The method of claim 16, wherein when the channel type is an email channel, the user response value is based upon an interaction event detected in association with an email sent to the user.

19. The method of claim 16, wherein when the channel type is a website channel, the user response value is based upon an interaction event detected in association with a website element displayed to the user.

20. The method of claim 14, wherein the computing device reduces a number of features in the channel feature vector using recursive feature elimination or agglomerative feature clustering prior to aggregating the identified features into a common feature vector.

21. The method of claim 20, wherein the number of features in the common feature vector is less than the number of features in the channel feature vector.

22. The method of claim 14, wherein the engagement threshold value associated with each different channel type indicates a baseline value at which a given user is considered to be engaged with the channel type.

23. The method of claim 22, wherein the engagement probability value indicates a likelihood that a given user is engaged with the corresponding channel type.

24. The method of claim 14, wherein the distance value comprises a difference that the engagement probability value for each selected user identifier is greater than the corresponding engagement threshold value for the channel type.

25. The method of claim 14, wherein communicating with a remote computing device associated with the selected user identifier comprises initiating one or more outbound communications from the computing device to the remote computing device using the communication channel that is identified using the first binary value for the selected user identifier in the user contact matrix.

26. The method of claim 14, further comprising:

determining, by the server computing device, one or more user attributes of a new user without any historical user activity data and generate a multidimensional vector based upon the one or more user attributes;

comparing, by the server computing device, the multidimensional vector for the new user attributes to a centroid vector of each of one or more clusters associated with historical user data and assign the multidimensional vector for the new user attributes to the cluster with the centroid vector that is most similar to the multidimensional vector;

generating, by the server computing device, an engagement probability score for the new user in each of a plurality of communication channels by determining an average engagement probability score of all users in the assigned cluster for each of the plurality of communication channels;

selecting, by the server computing device, a communication channel associated with a highest engagement probability score for the new user; and communicating, by the server computing device, with a remote computing device associated with the new user via the selected communication channel.

* * * * *